US012775744B2

(12) United States Patent
Vaidya et al.

(10) Patent No.: US 12,775,744 B2
(45) Date of Patent: Oct. 27, 2026

(54) SYSTEMS AND METHODS FOR GENERATING SYNTHETIC DATA FOR ANONYMIZATION

(71) Applicant: ServiceNow, Inc., Santa Clara, CA (US)

(72) Inventors: Narendra Diwakar Vaidya, San Jose, CA (US); Sid Ravindra Shetye, San Diego, CA (US); Kamalendu Biswas, San Ramon, CA (US)

(73) Assignee: ServiceNow, Inc., Santa Clara, CA (US)

( * ) Notice: Subject to any disclaimer, the term of this patent is extended or adjusted under 35 U.S.C. 154(b) by 123 days.

(21) Appl. No.: 18/978,892

(22) Filed: Dec. 12, 2024

(65) Prior Publication Data

US 2026/0170175 A1 Jun. 18, 2026

(51) Int. Cl.
*G06F 21/00* (2013.01)
*G06F 21/62* (2013.01)

(52) U.S. Cl.
CPC ................................ *G06F 21/6254* (2013.01)

(58) Field of Classification Search
None
See application file for complete search history.

(56) References Cited

U.S. PATENT DOCUMENTS 11,228,566 B1 * 1/2022 Kothari ................. G06F 16/258
11,755,771 B2 9/2023 Abad et al.
11,783,072 B1 10/2023 Ton-That
12,182,311 B1 * 12/2024 Ardhanari ........... G06F 21/6254
12,651,600 B1 * 6/2026 Rai ......................... G10L 15/22
2021/0248270 A1 * 8/2021 Durvasula ........... G06F 21/6254
2024/0078337 A1 3/2024 Kamyshenko et al.
2024/0419830 A1 * 12/2024 Park ...................... G06F 16/242
2025/0028859 A1 * 1/2025 Huver ................. G06F 21/6254
2025/0165650 A1 * 5/2025 Rahimov ............ G06F 21/6254
2026/0111286 A1 * 4/2026 Tarasiewicz .......... G06F 9/5044
2026/0119499 A1 * 4/2026 Ferroni ................. G06F 16/243
2026/0141113 A1 * 5/2026 Singh .................. G06F 21/6254

OTHER PUBLICATIONS

Ghavamipour, Ali Reza et al. Federated Synthetic Data Generation with Stronger Security Guarantees. SACMAT '23: Proceedings of the 28th ACM Symposium on Access Control Models and Technologies. https://dl.acm.org/doi/10.1145/3589608.3593835 (Year: 2023).*
Liu, Fan et al. Privacy-Preserving Synthetic Data Generation for Recommendation Systems. SIGIR '22: Proceedings of the 45th International ACM SIGIR Conference on Research and Development in Information Retrieval. https://dl.acm.org/doi/pdf/10.1145/3477495.3532044 (Year: 2022).*

* cited by examiner

*Primary Examiner* — Jeremiah L Avery
(74) *Attorney, Agent, or Firm* — FLETCHER YODER PC

(57) ABSTRACT

Systems and methods are provided for generating and using synthetic data to anonymize sensitive data in a query (e.g., a prompt) to preserve the data format and characteristics of the sensitive data while protecting the sensitive data. Sensitive data in a query are discovered or identified and synthetic data are generated for the sensitive data based on data patterns of the sensitive data. The synthetic data are used to replace (wholly or partially) the sensitive data in the query, resulting in an anonymized query, which is used to generate a query response. The query response is deanonymized so that the synthetic data are replaced with the corresponding sensitive data in the final query response.

20 Claims, 10 Drawing Sheets

SYSTEMS AND METHODS FOR GENERATING SYNTHETIC DATA FOR ANONYMIZATION

TECHNICAL FIELD

The present disclosure relates generally to data anonymization, and more specifically to generating synthetic data for anonymization.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, as well as IT infrastructure, such as routers, load balancers, firewalls, switches, etc.) and software resources (e.g. productivity software, database applications, large language models (LLMs), generative artificial intelligence (AI) applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing-based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

However, data within an organization or an enterprise often includes sensitive user data or sensitive customer data (e.g., names, contact information, Social Security numbers, financial data, medical data, etc.), and accessing cloud computing resources using the sensitive user data or sensitive customer data may create potential privacy issues (e.g., data breach). Currently available data encryption techniques may include removing the sensitive data or simply replacing the sensitive data with other characters (e.g., nonce characters), which may modify the data format or characteristics (e.g., statistical properties, statistical relationships). Modifying the format or characteristics often causes problems with data integrity (e.g., accuracy, consistency, context), such as generating datasets that are inconsistent with each other. Data encryption techniques that keep the data format or characteristics of the sensitive data are needed to improve data integrity.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a method includes identifying a data pattern associated with a sub-portion of a dataset; generating synthetic data based on the data pattern; anonymizing the sub-portion of the dataset, based on the synthetic data, to generate anonymized data; transmitting a query to an LLM, wherein the query comprises the anonymized data; receiving, from the LLM, a response to the query; and deanonymizing the response based on the synthetic data.

In another embodiment, a system includes processing circuitry and a memory, accessible by the processor. The memory stores instructions that, when executed by the processing circuitry, cause the processing circuitry to perform operations including: identifying a data pattern associated with a sub-portion of a dataset; generating synthetic data based on the data pattern; anonymizing the sub-portion of the dataset based on the synthetic data, to generate anonymized data; transmitting a query to an LLM, wherein the query comprises the anonymized data; receiving, from the LLM, a response to the query; and deanonymizing the response based on the synthetic data.

In a further embodiment, a non-transitory, computer readable medium including instructions that, when executed by processing circuitry, cause the processing circuitry to perform operations including: identifying a data pattern associated with a sub-portion of a dataset; generating synthetic data based on the data pattern; anonymizing the sub-portion of the dataset, based on the synthetic data, to generate anonymized data; transmitting a query to an LLM, wherein the query comprises the anonymized data; receiving, from the LLM, a response to the query; and deanonymizing the response based on the synthetic data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
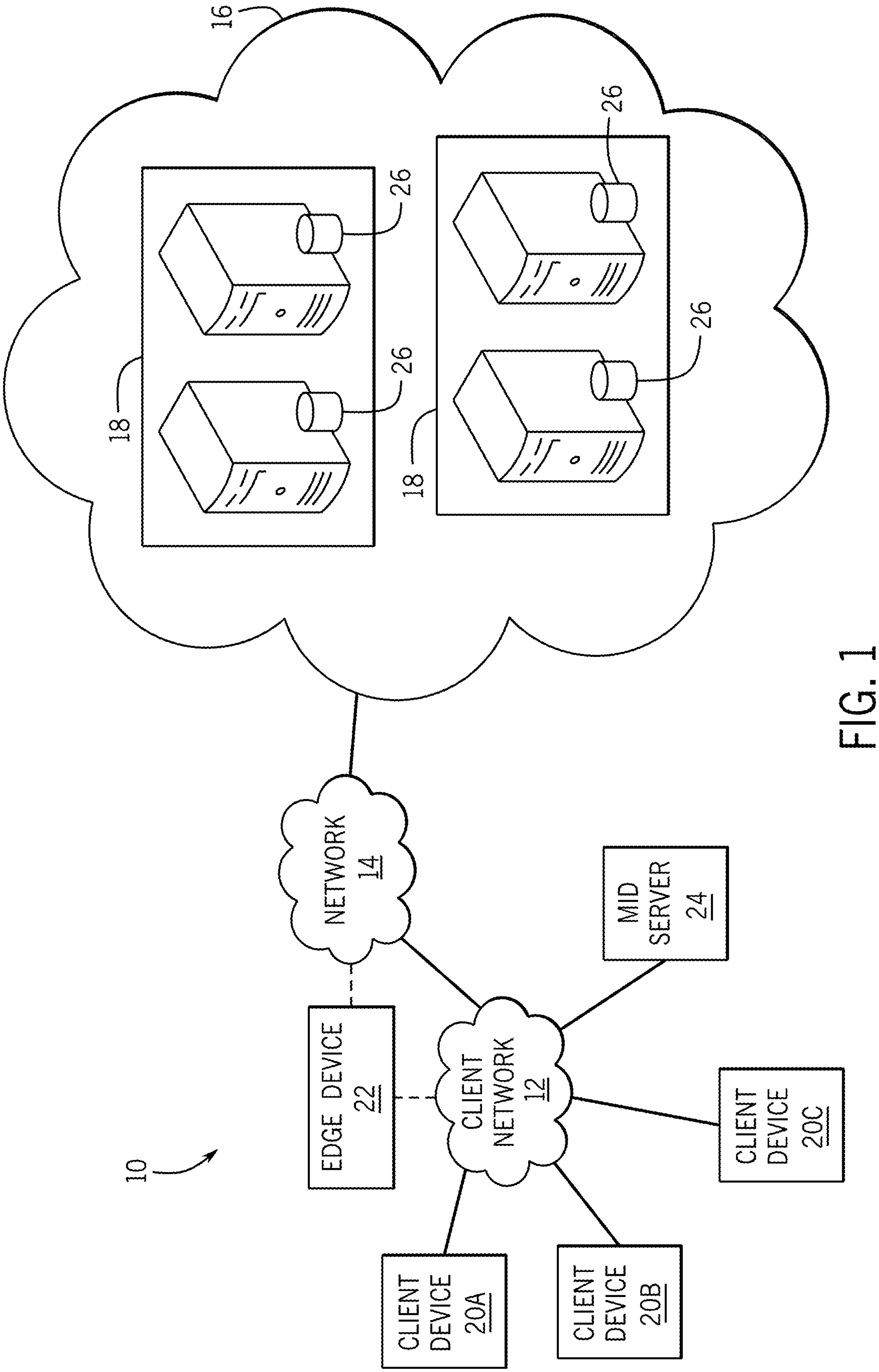
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed herein, data within an enterprise often includes sensitive user data or sensitive customer data (e.g., names, contact information, Social Security numbers, financial data, medical data, etc.). In some instances, use of generative artificial intelligence (AI) to enhance a product functionality (such as summarization, root cause identification, problem diagnosis, remedy recommendation, troubleshooting, etc.) may involve sending user data, including sensitive data, to a third-party AI service. Sending sensitive user data to a third-party AI service may create data privacy issues and/or violate data policies.

Previously available data encryption techniques may include removing the sensitive data or replacing the sensitive data with other characters (e.g., nonce characters), which may modify the data format (e.g., a predefined relationship of the data, a predefined data structure, a predefined data style, a predefined alphanumerical format) or characteristics (e.g., statistical properties, statistical relationships). Modifying the format or characteristics often causes problems with data integrity (e.g., accuracy, consistency, context), such as generating datasets that are inconsistent with each other. For example, in current data encryption technique, a credit card number in a query may be encrypted by replacing each digit with a character "x" or a random number. However, a valid credit card number may follow a certain data format (e.g., a predefined relationship, a predefined data structure) and have certain characteristics. For example, a valid credit card number for a certain type of credit card may start with a designated digit (e.g., a card from a first card provider may start with a number "4"), and the last digit of the credit card number may be a check sum of the card number. Therefore, encrypting a credit card number by replacing each digit with a certain character (e.g., "x") or a random number may cause the encrypted credit card number to lose the data format and characteristics of the original credit card number and, in some instances, appear to be an invalid credit card number due to the failure of check sums or other security measures.

Some AI models (e.g., a large language model (LLM)) may generate responses based on query intents and query contextual data, which may be associated with the data format and characteristics included in the query. Accordingly, modifying the data format and characteristics may affect the accuracy of the responses. For example, the LLM may not be able to determine the credit card type associated with the encrypted credit card number. Accordingly, the response from the LLM based on the encrypted credit card number may be less useful for some applications.

Synthetic data may be used to anonymize sensitive data in a query (e.g., a prompt) to preserve the data format and characteristics of the sensitive data while protecting the sensitive data. Synthetic data is artificial data generated to simulate the original data. Synthetic data may preserve the data format and characteristics of the original data but may be completely independent of the original data. Accordingly, the original data may not be traced. For example, a synthetic credit card number for a first credit card provider may be generated for a credit card number, and the synthetic credit card number may keep the statistical properties (e.g., the first digit is number "4", the last digit a check sum of the card number) of the original credit card number while staying otherwise independent of the original credit card number.

Various embodiments disclosed herein are directed to identifying sensitive data in a query, generating synthetic data for the sensitive data based on data patterns of the sensitive data, and replacing (wholly or partially) the sensitive data in the query with synthetic data, resulting in an anonymized query, which may be provided to an AI service to generate a query response. The synthetic data may conform to the data pattern characteristics of the corresponding sensitive data. The data pattern characteristics of the sensitive data may be identified from existing data patterns or may be provided by the user. The sensitive data in the query may be replaced with the synthetic data before the query is sent to an AI service. When a query response is received from the AI service, the mapping of the sensitive data to the synthetic data may be used to deanonymize the query response so that the synthetic data may be replaced with the corresponding sensitive data in the final query response. This implementation may ensure that applications may use the query response transparently and effectively, and the actual sensitive data may never reach the third party (e.g., an AI service in this example).

By using synthetic data to anonymize the sensitive data, the system of the current disclosure improves data security while maintaining accuracy, clarity, and effectiveness of the query response. In some implementations, boundary conditions may be used with the anonymized query to improve the accuracy and efficiency of the query response. For example, a location or a time period may be used to provide a spatial range or a temporal range of the query, which may increase the likelihood of receiving a reasonable query response thereby providing faster search results and improving accuracy of the search results.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20A, 20B, 20C may be computing systems and/or other types of computing devices generally referred to as Internet of Things (IoT) devices that access cloud computing services, for example, via a web browser application or via an edge device 22 that may act as a gateway between the client devices 20A, 20B, 20C and the platform 16. FIG. 1 also illustrates that the client network 12 includes an administration or managerial application, device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, to transfer data between the client devices 20A, 20B, 20C and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20A, 20B, 20C via the client network 12 and network 14. The network hosting the platform 16 provides additional computing resources to the client devices 20A, 20B, 20C and/or the client network 12. For example, by utilizing the network hosting the platform 16, users of the client devices 20A, 20B, 20C are able to build and execute applications and/or workflows for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
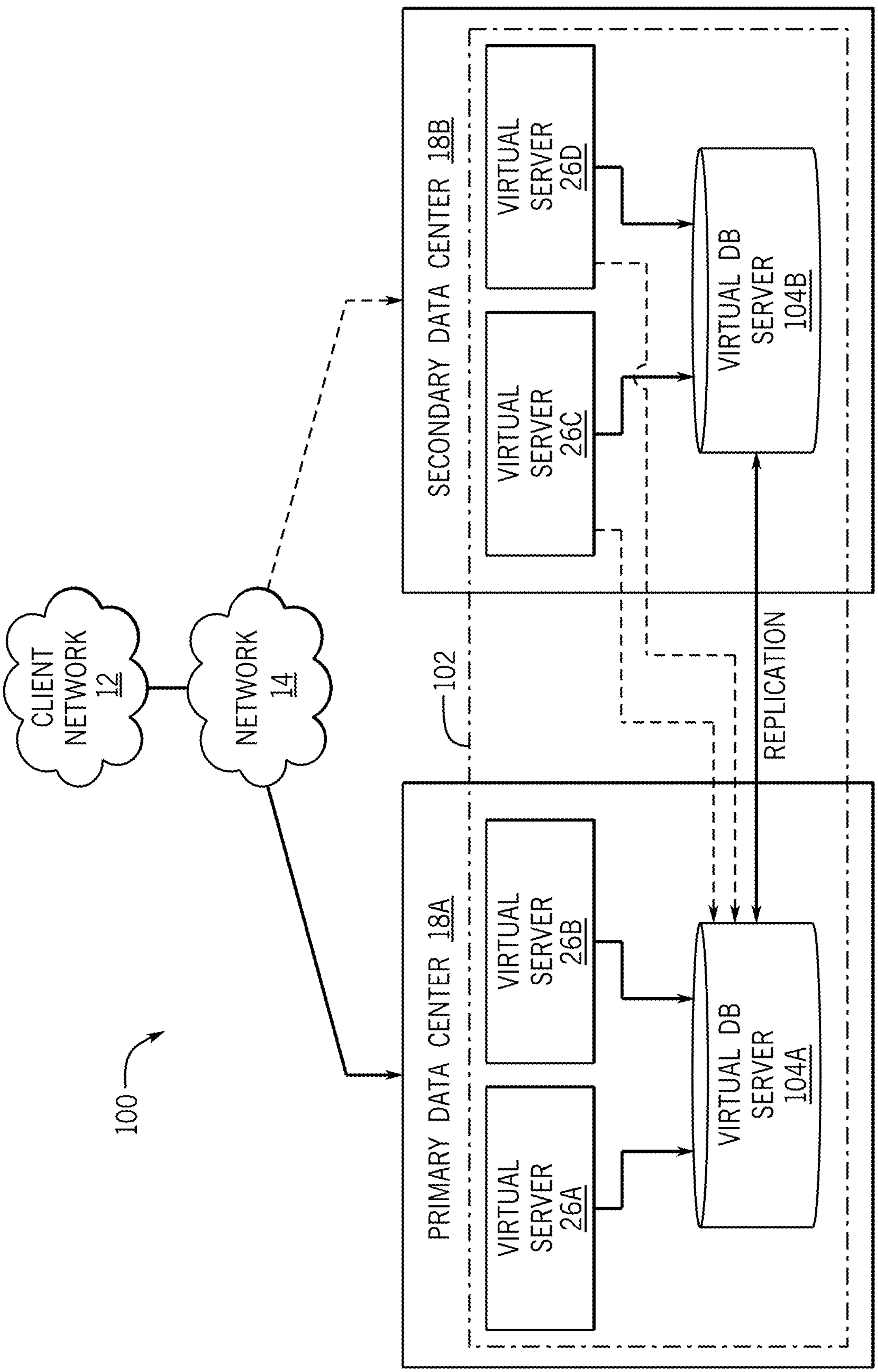
FIG. 2 is a schematic of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, this disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, edge devices, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
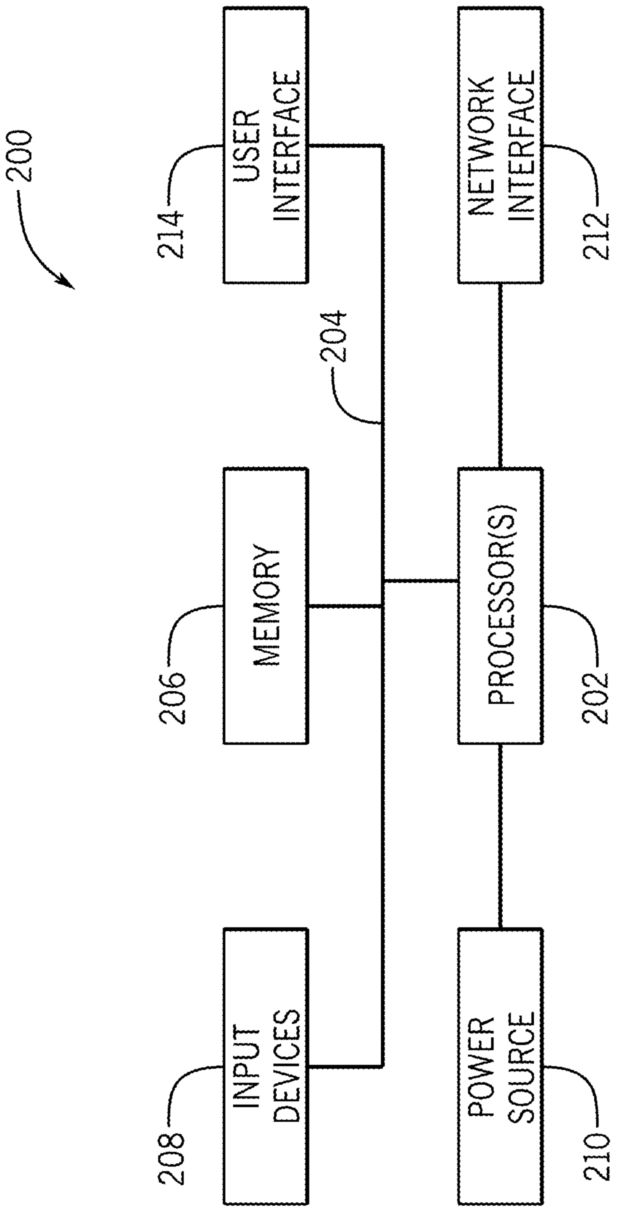
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computing system 200 may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
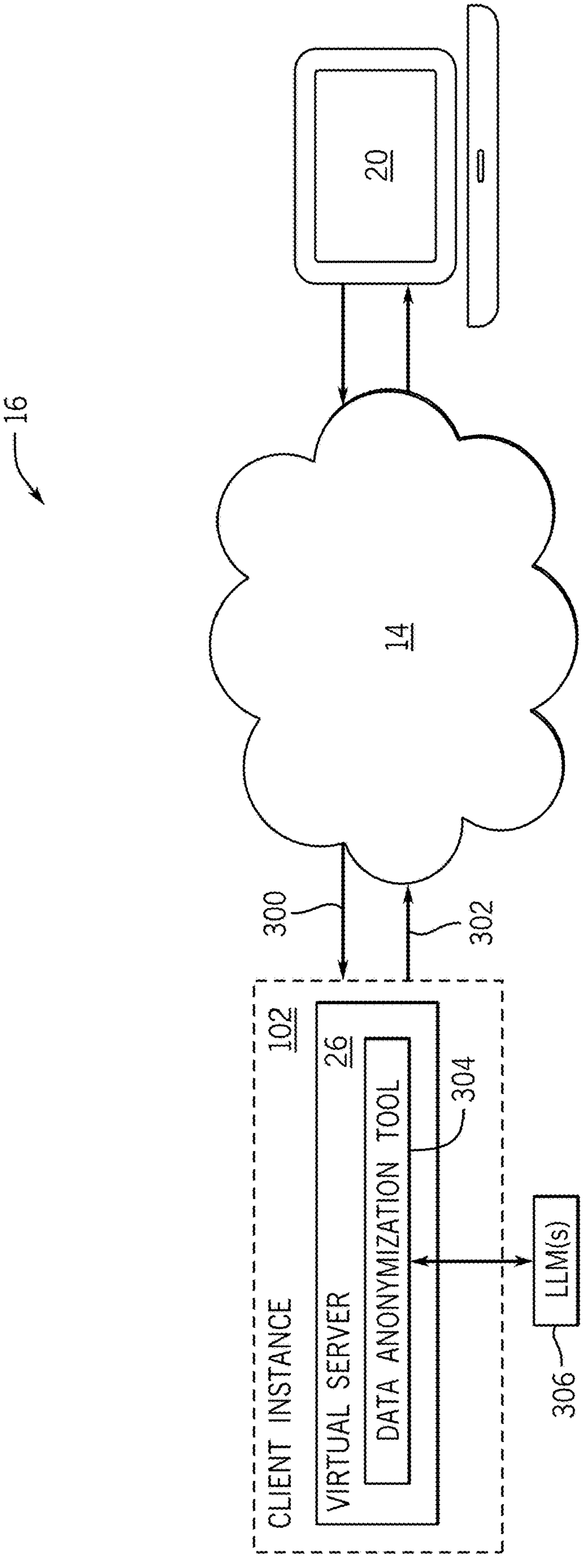
FIG. 4 is a block diagram illustrating a virtual server that supports and enables a client instance, in accordance with aspects of the present disclosure.

With the preceding in mind, FIG. 4 is a block diagram illustrating an embodiment in which a virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser or a native application running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

As shown, the client device 20 may interact with the client instance 102 by providing inputs 300, to which the client instance 102 may respond with outputs 302. In the embodiment shown in shown in FIG. 4, the virtual server 26 of the client instance 102 may run a data anonymization tool 304, which may be a software application defined by code, accessible via a native application or web browser of the client device 20. As is described in more detail below, the data anonymization tool 304 may anonymize data before the data is transmitted to one or more large language models 306 (LLMs) and deanonymize data in outputs from the one or more LLMs before being transmitted back to the client device as outputs 302. The one or more LLMs may be accessible to the client instance 102 (e.g., stored in another instance, stored on the same instance, stored in the cloud, stored on one or more servers accessible via the internet, etc.), to generate some or all of the outputs 302. As used herein, a large language model (LLMs) is a probabilistic model of a natural language used for general-purpose language generation. LLMs typically include one or more artificial neural networks having a transformer-base architecture. LLMs learn statistical relationships from text documents through training processes that may be supervised, semi-supervised, or self-supervised. During training, LLMs may learn syntax, semantics, and/or ontology. LLMs, when used for text generation, receive an input text and iteratively predict the next word or token. It should be understood that the client instance 102 shown in FIG. 4 may be utilized by the client device 20 for other tasks associated with workflows, as well as tasks beyond the scope of workflow generation and modification.

In some embodiments, the inputs 300 may include queries containing sensitive user data or sensitive customer data (e.g., names, contact information, Social Security numbers, financial data, medical data, etc.). Sending sensitive data (e.g., sensitive user data, sensitive customer data) to the LLMs 306 may create data privacy issues and/or violate data privacy policies. To avoid data privacy issues or violating data policies, the sensitive data in the inputs 300 may be identified and encrypted before sending to the LLMs 306. Since the LLMs 306 may generate responses based on query intents and query contextual data, which may be associated with the data format and characteristics included in the query, data encryption techniques that involve modifying data format and characteristics of the sensitive data may affect the accuracy of the responses generated by the LLMs 306. Accordingly, data encryption techniques that may not modify data format and/or other characteristics of the sensitive data are desired.

Synthetic data may be used to anonymize sensitive data in the inputs 300 to preserve the data format and/or characteristics of the sensitive data while protecting the sensitive data. Synthetic data includes data that are artificially generated and not related to real world information, therefore, synthetic data may be used to protect the sensitive data. Synthetic data may be generated using algorithms, mathematical models, computer simulations, etc., and the data format and characteristics of the sensitive data may be preserved in the synthetic data. For example, data patterns (e.g., data formats, data characteristics) of the sensitive data may be identified and used in the algorithms, mathematical models, or computer simulations to preserve the data format (e.g., a predefined relationship of the data, a predefined data structure, a predefined data style, a predefined alphanumerical format) and characteristics (e.g., statistical properties, statistical relationships) included in the sensitive data. Certain policies (e.g., data privacy policies) may also be considered when generating the synthetic data so that the generated synthetic data may qualify the policies. Since synthetic data may be generated to have the same data patterns of the sensitive data, data format and statistical properties of the synthetic data are consistent with the sensitive data. Accordingly, using the synthetic data to anonymize the sensitive data in the inputs 300 may not modify data format and characteristics of the sensitive data, and the response from the LLMs 306 may be more accurate and useful.

Figure 5:
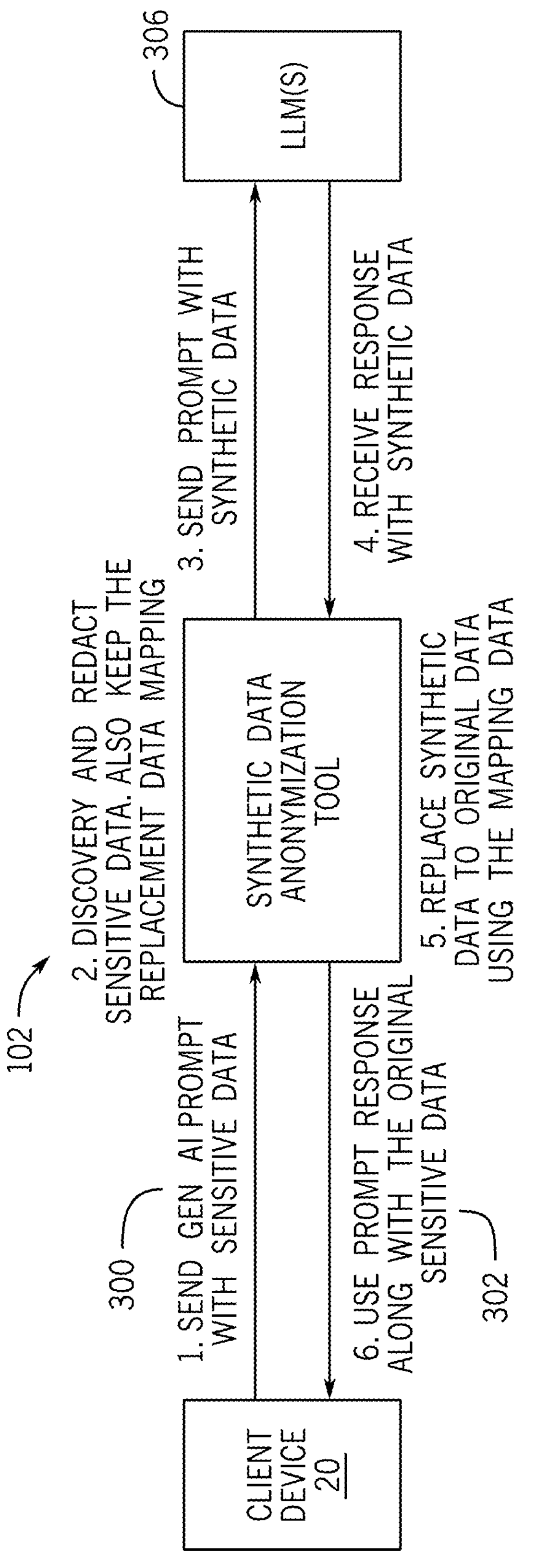
FIG. 5 is a block diagram illustrating an embodiment of a communication architecture between a client device and one or more large language models (LLMs) using a synthetic data anonymization tool, in accordance with aspects of the present disclosure.
Figure 7:
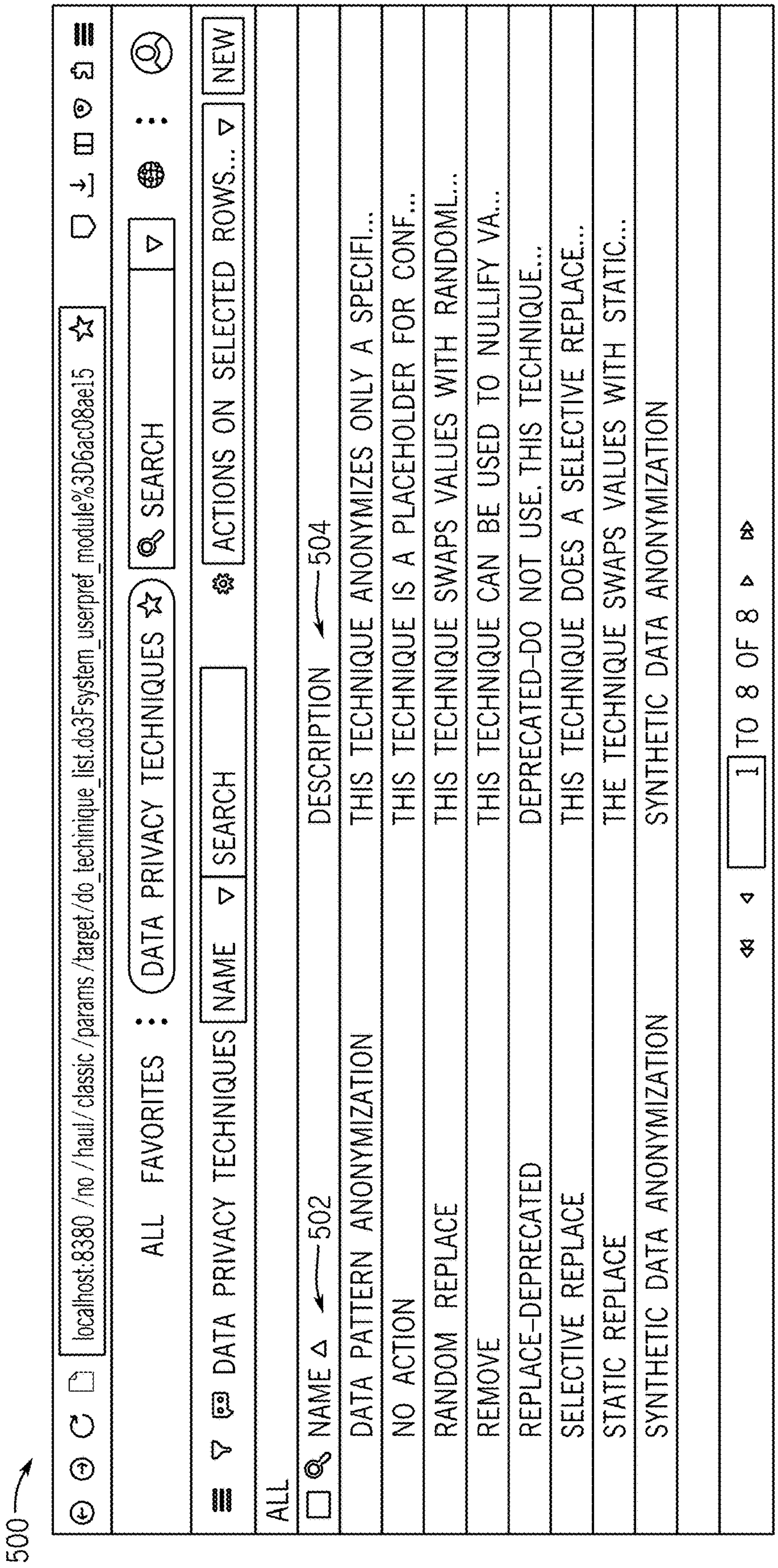
FIG. 7 is a screenshot of a GUI showing data privacy techniques that may be used in the process of FIG. 6, in accordance with aspects of the present disclosure.

The client instance 102 may be configured to receive inputs 300 and identify sensitive data in the inputs 300. The client instance 102 may be configured to identify data patterns (e.g., data formats, data characteristics) of the sensitive data. The data anonymization tool 304 may be configured to anonymize the sensitive data in the inputs 300. If a data pattern is identified, the data anonymization tool 304 may be configured to generate synthetic data for the sensitive data based on the data pattern (e.g., via a synthetic data anonymization tool, as illustrated in FIG. 5), as described in detail herein. If no data pattern is not identified, the data anonymization tool 304 may be configured to anonymize the sensitive data based on one or more selectable options, such as replacing with random data or static values, removing the sensitive data, etc., as illustrated in FIG. 7.

FIG. 5 is a block diagram illustrating an embodiment of a communication between the client device 20 and the LLMs 306 using a synthetic data anonymization tool. As illustrated in FIG. 5, the client device 20 may transmit queries having sensitive data in the inputs 300 to the client instance 102 (e.g., via the network 14). The client instance 102 may identify the sensitive data included in the inputs 300 and identify the data patterns (e.g., data formats, data characteristics) of the sensitive data. The client device 102 may generate synthetic data for the sensitive data using the identified data patterns. In some embodiments, a synthetic data anonymization tool may generate synthetic data using algorithms, mathematical models, computer simulations, etc., based on the identified data patterns to preserve the data format and characteristics included in the sensitive data. For example, scripting may be developed for each identified data pattern to generate corresponding synthetic data programmatically so that the generated synthetic data may have the same data pattern while otherwise anonymizing the sensitive data. In some embodiments, machine learning (ML) techniques may be used to generate the synthetic data. For example, machine learning models may be trained by using the sensitive data to identify data patterns in the sensitive data. In some embodiments, synthetic data may be generated based on certain policies (e.g., data privacy policies) so that the generated synthetic data may qualify in view of the policies.

After the synthetic data is generated for the sensitive data, a mapping of the sensitive data to the synthetic data may be recorded and stored for later use (e.g., deanonymization). The client instance 102 may anonymize the sensitive data included in the inputs 300 based on the generated synthetic data and send the queries with the synthetic data to the LLMs 306. The LLMs 306 may generate responses based on the queries with the synthetic data and send the responses to the client instance 102. After receiving the responses, the client instance 102 may deanonymize the responses based on the mapping of the sensitive data to the synthetic data. For example, the client instance 102 my replace the synthetic data in the responses with the corresponding sensitive data according to the mapping. The client instance 102 may send the deanonymized responses to the client device 20. By using synthetic data to anonymize the sensitive data in the inputs 300, data format and characteristics of the sensitive data may be preserved, and the response from the LLMs 306 may be more accurate and useful.

In some embodiments, the edge device 22 shown in FIG. 1 may act as a gateway between the client device 20 and the client instance 102, and the client device 20 may send the inputs 300 through the edge device 22 to the client instance 102. Accordingly, the synthetic data anonymization tool may run partially or entirely on the edge device 22. In such embodiments, the edge device 22 may discover the sensitive data included in the inputs 300 and identify the data patterns (e.g., data formats, data characteristics) of the sensitive data. The edge device 22 may generate synthetic data for the sensitive data using the identified data patterns. In some embodiments, synthetic data may be generated using algorithms, mathematical models, computer simulations, etc., based on the identified data patterns to preserve the data format and characteristics included in the sensitive data. For example, scripting may be developed for each identified data pattern to generate corresponding synthetic data programmatically so that the generated synthetic data may have the same data pattern. In some embodiments, machine learning (ML) techniques may be used to generate the synthetic data. For example, machine learning models may be trained by using the sensitive data to identify data patterns in the sensitive data. In some embodiments, synthetic data may be generated based on certain policies (e.g., data privacy policies) so that the generated synthetic data may qualify the policies. After the synthetic data is generated for the sensitive data, a mapping of the sensitive data to the synthetic data may be recorded and stored for later use (e.g., deanonymization). The edge device 22 may anonymize the sensitive data included in the inputs 300 based on the generated synthetic data and send the inputs 300 with the synthetic data to the client instance 102, which may send the queries included in the inputs 300 to the LLMs 306 to generate responses. After receiving the responses from the LLMs 306, the client instance 102 may send the response to the edge device 22, which may deanonymize the responses based on the mapping of the sensitive data to the synthetic data. For example, the edge device 22 my replace the synthetic data in the responses with the corresponding sensitive data according to the mapping. The edge device 22 may send the deanonymized responses to the client device 20. By using the edge device 22 to anonymize the sensitive data included in the inputs 300 before sending the inputs 300 to the client instance 102 and deanonymize the responses before sending the responses to the client device 20, the sensitive data may be accessed only by the client's devices (e.g., the client device 20, the edge device 22), which may provide additional privacy protection and avoid security issues.

In the embodiment illustrated in FIG. 5, the sensitive data may be included in the real-time inputs 300 from the client device 20. However, in other embodiments, the sensitive data may be included in a dataset stored in a memory (e.g., the memory 206 of FIG. 3). For example, queries including sensitive data may be stored in the memory when the LLMs 306 is not available (e.g., busy or under maintenance) for the queries, and the client instance 102 (or the edge device 22) may anonymize the sensitive data included in the queries based on corresponding synthetic data and send the anonymized data to the LLMs 306 when the LLMs 306 is available for the queries. In some embodiments, the same sensitive data may be included in several datasets or several queries, and the synthetic data generated for the sensitive data of a query may be used to anonymize the same sensitive data included in other queries or datasets to preserve the data integrity of the queries or datasets. In some embodiments, for the same sensitive data included in several datasets or several queries, different synthetic data may be generated for the same sensitive data of different queries or different datasets to achieve improved privacy protection.

Figure 6:
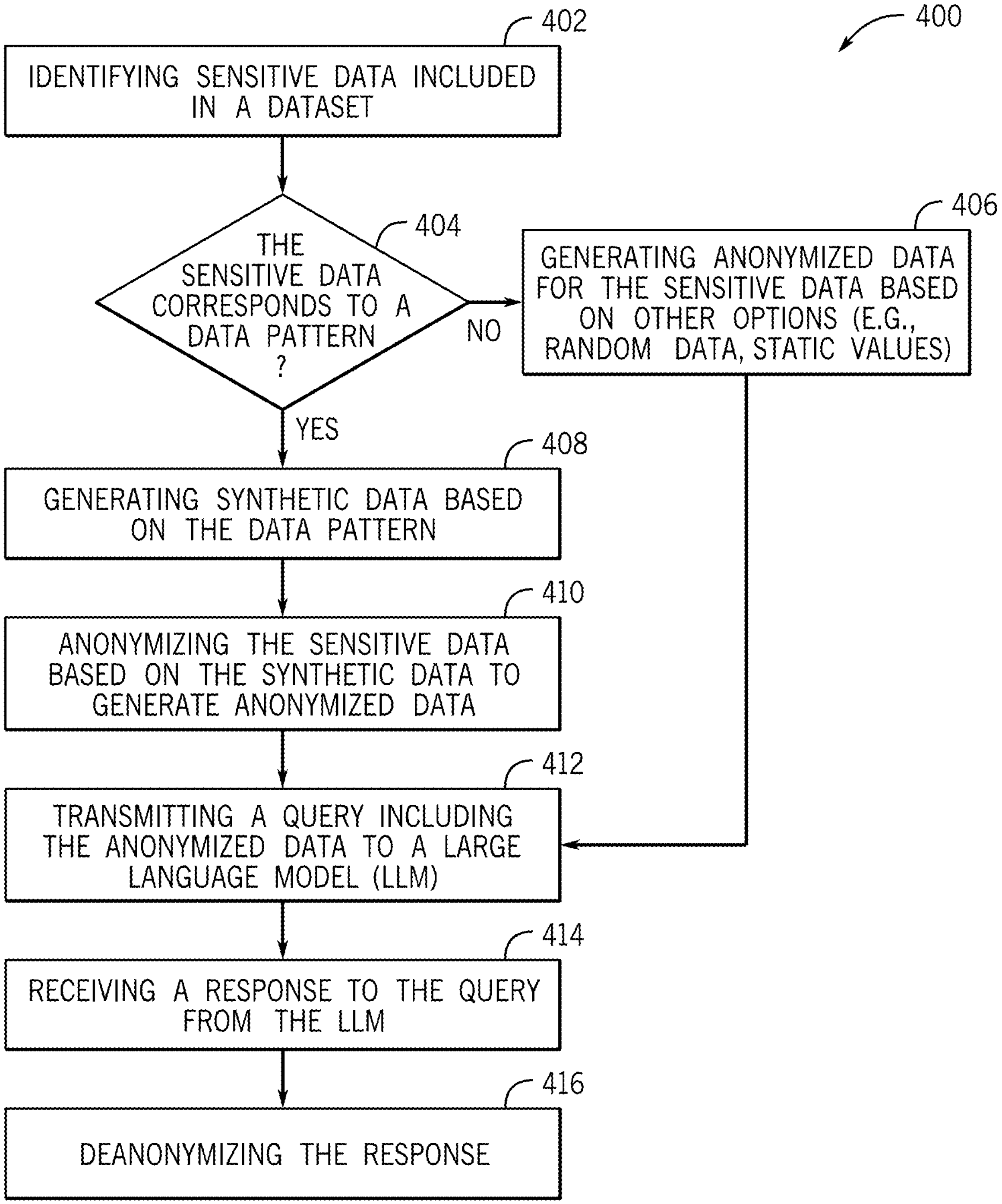
FIG. 6 is a flow chart illustrating a process of using synthetic data to anonymize sensitive data included in a dataset, in accordance with aspects of the present disclosure.

FIG. 6 is a flowchart of a process 400 for using synthetic data to anonymize sensitive data included in a dataset (e.g., in a query included in the inputs 300 or a query stored in the memory 206). At block 402, sensitive data included in the dataset may be discovered or identified (e.g., by the client instance 102 or the edge device 22). For example, sensitive data in certain categories may be identified, such as names, contact information, Social Security numbers, financial data, medical data, etc. Moreover, certain policies (e.g., data privacy policies) may be considered when searching for sensitive data to avoid violating the policies.

At block 404, the sensitive data may be analyzed (e.g., by a ML model) to identify the data pattern (e.g., Emails, Social Security Numbers) of the sensitive data. In addition, an input from the user (e.g., the user device 20) may be used to indicate a defined data pattern. If no data pattern may be found for the sensitive data at block 404, the sensitive data may be anonymized, at block 406, to generate anonymized data using one or more selectable options, such as replacing with random data or static values, removing the sensitive data, etc., as illustrated in FIG. 7. A mapping of the replacement data to the sensitive data may be generated and stored for later user (e.g., deanonymization).

If a data pattern is identified at block 404, synthetic data may be generated (e.g., by the client instance 102 or the edge device 22) based on the data pattern at block 408. For example, synthetic data may be generated using algorithms, mathematical models, computer simulations, etc., based on the identified data pattern to preserve the data format and characteristics included in the sensitive data (i.e., to maintain or adhere to the identified pattern). In some embodiments, a user may select certain synthetic data to be used for anonymizing the sensitive data. For example, a user may provide (e.g., in an attachment file) selected synthetic values for the sensitive data, or, boundary conditions adding limits (e.g., time, location, a predefined value) to the synthetic data for the sensitive data. The selected synthetic values and/or the boundary conditions may be provided to the LLMs 306 with the query.

At block 410, the sensitive data may be anonymized based on the generated synthetic data to generate anonymized data. For example, the sensitive data may be replaced or partially replaced by the synthetic data. For example, a query may include a name and information associated with the name (e.g., contact information, Social Security number). While the name and the information associated with the name may be sensitive data, in some embodiments, replacing a portion of the sensitive data (e.g., the Social Security number) might be sufficient for protecting the sensitive data and/or satisfying certain policies. Thus the sensitive data may be selectively replaced, and this option may be selectable, as illustrated in FIG. 7. A mapping of the synthetic data to the sensitive data may be generated and stored for later user (e.g., deanonymization). Since synthetic data may be generated to have the same data patterns of the sensitive data, data format and statistical properties of the synthetic data are consistent with the sensitive data. Accordingly, using the synthetic data to anonymize the sensitive data may preserve the data format and characteristics of the sensitive data, and the response from the LLMs 306 may be more accurate and useful. By using synthetic data to anonymize the sensitive data, the system of the current disclosure improves data security while maintaining accuracy, clarity, and effectiveness of the query response.

At block 412, a query including the anonymized data obtain at block 406 or block 410 may be transmitted to the LLMs 306, and the LLMs 306 may generate a response based on the anonymized data. In some implementations, boundary conditions may be used with the query to improve the accuracy and efficiency of the query response. For example, a location or a time period may be used to provide a spatial range or a temporal range of the query, which may increase the likelihood of receiving a reasonable query response thereby providing faster search results and improving accuracy of the search results.

At block 414, the response may be received by the client instance 102 or the edge device 22, and the response may be deanonymized, at block 416, by using the corresponding mapping between the sensitive data and the synthetic data or the corresponding mapping between the sensitive data and the replacement data. In some embodiments, the response may be analyzed to generate a confidence score based on information associated with the sensitive data (e.g., query contextual data, query intents). If the confidence score is larger than a predetermined threshold value (e.g., 70%), the response may be used for the query and output to the user. If the confidence score is not larger than the predetermined threshold value, the response may not be used for the query and additional boundary conditions may be added to the query and transmitted to the LLMs 306 with the anonymized data to generate the response again. The boundary conditions may add limits (e.g., time, location, a predefined value) to the synthetic data, which may help to improve the accuracy and efficiency of the query response, resulting in increased confidence score of the response. For example, a location or a time period may be used to provide a spatial range or a temporal range of the query, which may increase the likelihood of receiving a reasonable query response thereby providing faster search results and improving accuracy of the search results.

Figure 8:
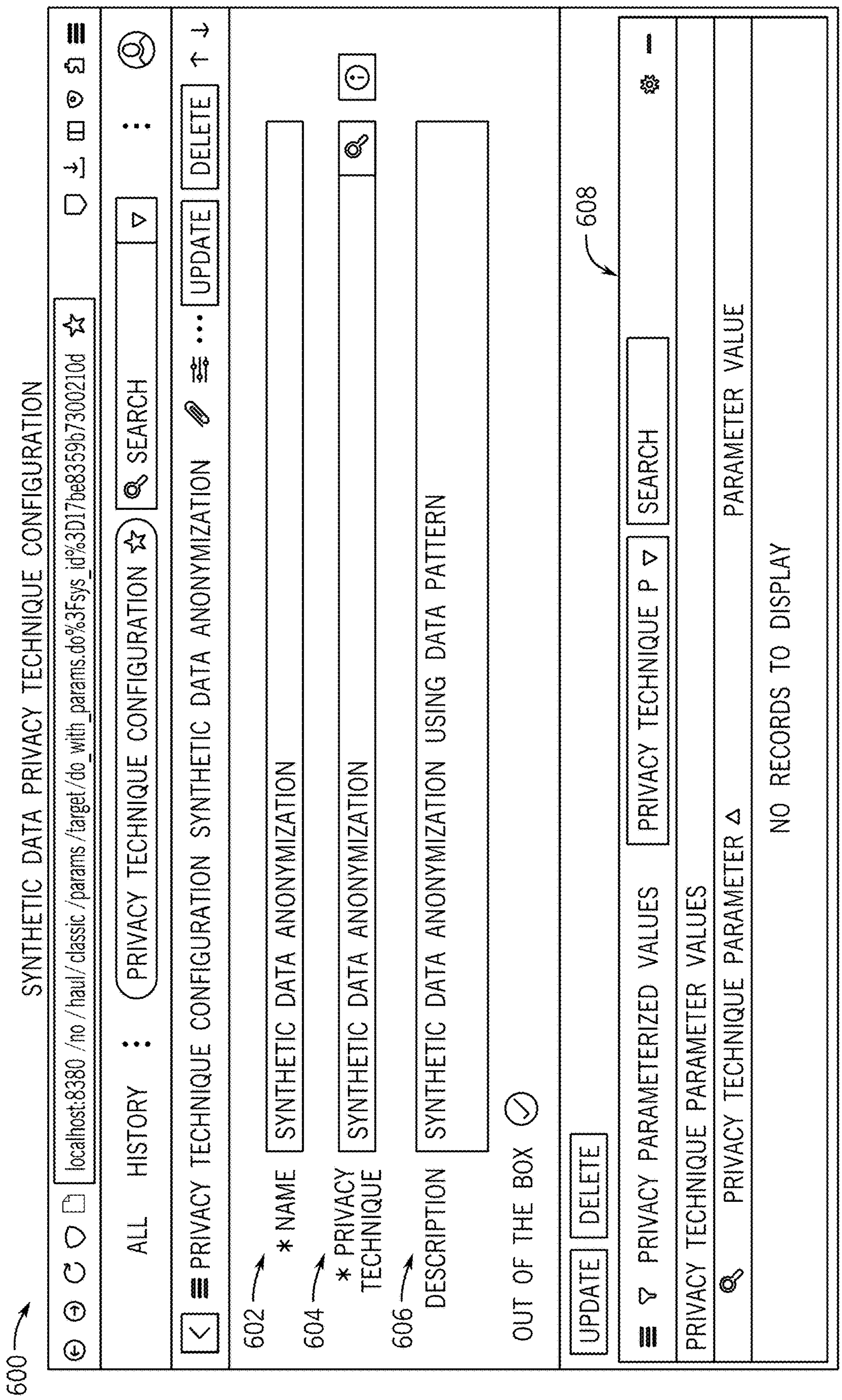
FIG. 8 is a screenshot of a GUI showing configuration settings in the GUI of FIG. 7, in accordance with aspects of the present disclosure.

With the foregoing in mind, FIGS. 7-10 represent example screenshots of corresponding graphic user interfaces (GUIs) that may be used in the process 400 described above. As shown in FIG. 7, a GUI 500 includes a name section 502 in which a list of data privacy techniques is provided. A data privacy technique may be selected from the list for generating the anonymized data, as described above with reference to FIG. 6. The GUI 500 also includes a description section 504 to include corresponding descriptions for the data privacy techniques listed in the name section 502. For example, the list of data privacy techniques may include "Synthetic Data Anonymization," which may be used to generate anonymized data based on a data pattern. The list of data privacy techniques may also include other options that may be used to generate anonymized data not based on a data pattern, such as "Random Replace," "Remove," "Selective Replace," "Static Replace," etc. The options in the list of data privacy techniques may be configured using configuration settings, as illustrated in FIG. 8. It should be understood, however, that the GUIs shown in FIG. 7 is merely an example, that other GUIs are envisaged, and that the disclosed techniques may be utilized with any other GUIs. For example, data privacy techniques included in the list of data privacy techniques may be different, which may be determined based on the sensitive data.

FIG. 8 shows a GUI 600 that may be used to set the configuration settings for a data privacy technique (e.g., the "Synthetic Data Anonymization") in the list of data privacy techniques in FIG. 7. The GUI 600 may include a name section 602, a privacy technique type section 604, a description section 606, and a privacy parameterized values section 608. The privacy parameterized values section 608 may be used to set values for parameters used in the data privacy technique. For example, in the illustrated embodiment of FIG. 8, the privacy technique parameter may include boundary conditions, which may be used to add limits (e.g., time, location, a predefined value) to the synthetic data, and the parameter value may include the corresponding values for the boundary conditions. As shown in FIG. 8, privacy technique parameters in the privacy parameterized values section 608 may be edited (e.g., updated, deleted).

Figure 9:
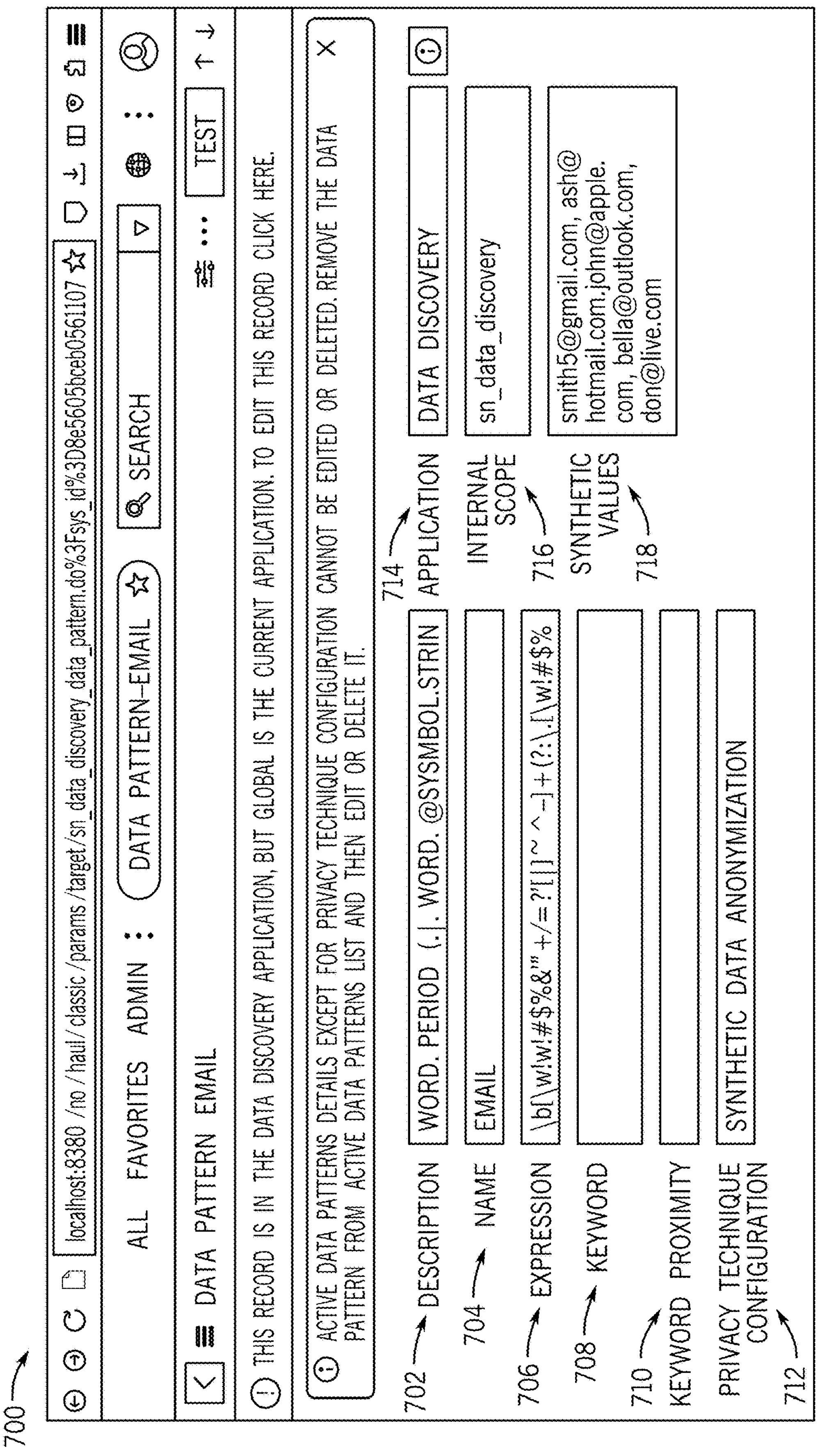
FIG. 9 is a screenshot of a GUI describing an embodiment of a data pattern that may be used in the process of FIG. 6, in accordance with aspects of the present disclosure.

FIG. 9 shows a GUI 700 that may be used to describe an embodiment of a data pattern (e.g., Email data pattern). The GUI 700 may include a description section 702 to include descriptions of the data format of a data pattern; a name section 704 to include the name of the data pattern (e.g., Email); an expression section 706 to indicate characteristics of the data pattern. The GUI 700 may include a keyword section 708 and a keyword proximity section 710 for the data pattern, a privacy technique configuration section 712, an application section 714, an internal scope section 716. The GUI 700 may also have a synthetic values section 718 to include synthetic values that are generated for sensitive data based on the data pattern and may be used to generate anonymized data for the sensitive data. For example, a user may provide selected synthetic values via the synthetic values section 718. In some embodiments, the selected synthetic values may be provided in a file, which may be uploaded via the synthetic values section 718. The selected synthetic values may be provided to the LLMs 306 with the query.

Figure 10:
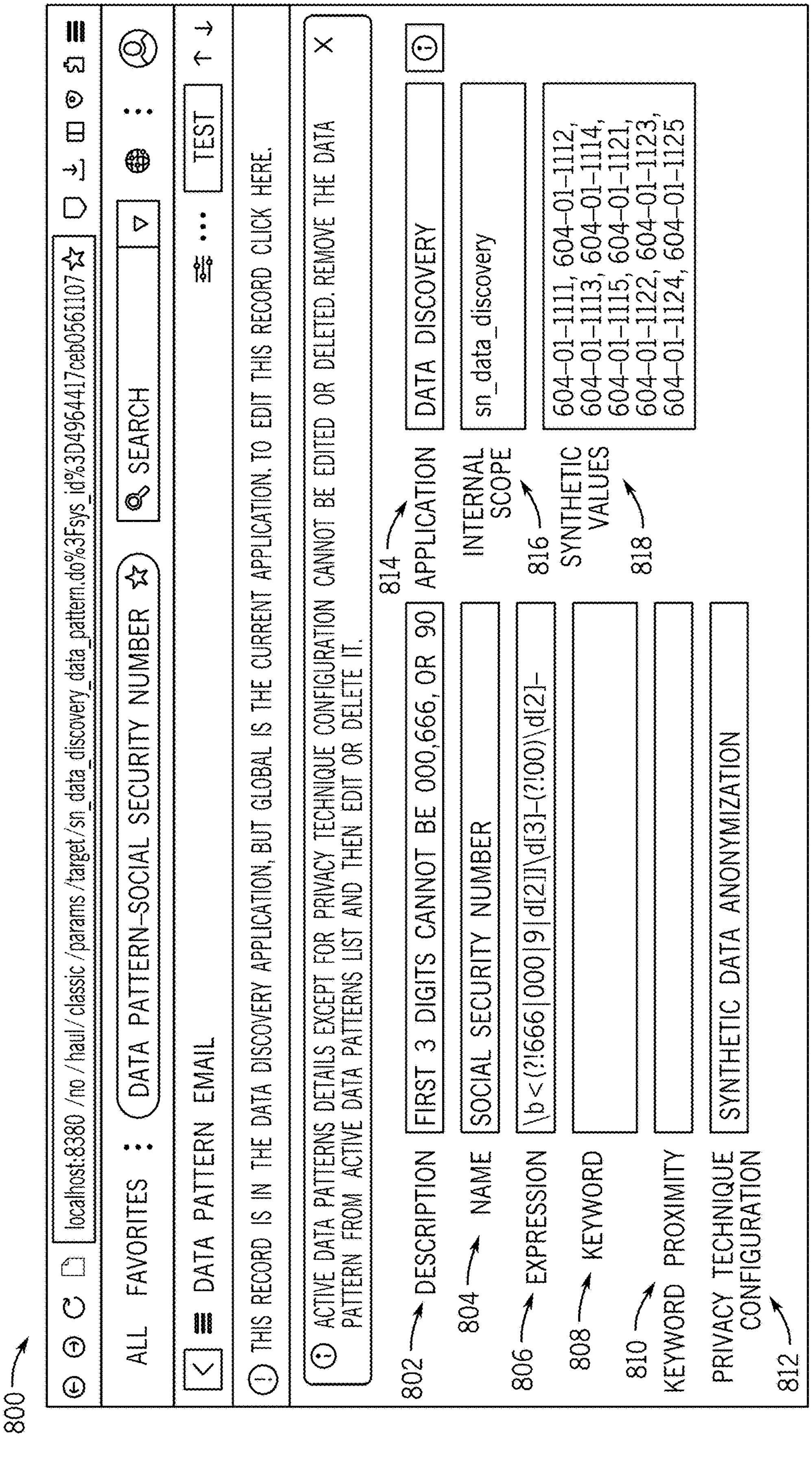
FIG. 10 is a screenshot of GUI describing another embodiment of a data pattern that may be used in the process of FIG. 6, in accordance with aspects of the present disclosure.

FIG. 10 shows a GUI 800 that may be used to describe another embodiment of a data pattern (e.g., Social Security Number data pattern). The GUI 800 may include a description section 802 to include descriptions of the data format of a data pattern; a name section 804 to include the name of the data pattern (e.g., Social Security Number); an expression section 806 to indicate characteristics of the data pattern. The GUI 800 may include a keyword section 808 and a keyword proximity section 810 for the data pattern, a privacy technique configuration section 812, an application section 814, an internal scope section 816. The GUI 800 may also have a synthetic values section 818 to include synthetic values that are generated for sensitive data based on the data pattern and may be used to generate anonymized data for the sensitive data. For example, a user may provide selected synthetic values via the synthetic values section 818. In some embodiments, the selected synthetic values may be provided in a file, which may be uploaded via the synthetic values section 818. The selected synthetic values may be provided to the LLMs 306 with the query.

It should be understood, however, that the GUIs shown in FIGS. 7-10 are merely examples, that other GUIs are envisaged, and that the disclosed techniques may be utilized with any other GUIs.

The presently disclosed techniques are directed to generating and using synthetic data to anonymize sensitive data in a query (e.g., a prompt) to preserve the data format and characteristics of the sensitive data while protecting the sensitive data. Synthetic data is artificial data generated to simulate the original data. Synthetic data may preserve the data format and characteristics of the original data but may be completely independent of the original data. Accordingly, the original data may not be traced. Various embodiments disclosed herein are directed to identifying sensitive data in a query, generating synthetic data for the sensitive data based on data patterns of the sensitive data, and replacing (wholly or partially) the sensitive data in the query with synthetic data, resulting in an anonymized query, which may be provided to an AI service to generate a query response. The synthetic data may conform to the data pattern characteristics of the corresponding sensitive data. The data pattern characteristics of the sensitive data may be identified from existing data patterns or may be provided by the user. The sensitive data in the query may be replaced with the synthetic data before the query is sent to an AI service. When a query response is received from the AI service, the mapping of the sensitive data to the synthetic data may be used to deanonymize the query response so that the synthetic data may be replaced with the corresponding sensitive data in the final query response. This implementation may ensure that applications may use the query response transparently and effectively, and the actual sensitive data may never reach the third party (e.g., an AI service in this example).

By generating and using synthetic data to anonymize the sensitive data, the system of the current disclosure improves data security while maintaining accuracy, clarity, and effectiveness of the query response. In some implementations, boundary conditions may be used with the anonymized query to improve the accuracy and efficiency of the query response. For example, a location or a time period may be used to provide a spatial range or a temporal range of the query, which may increase the likelihood of receiving a reasonable query response thereby providing faster search results and improving accuracy of the search results.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method comprising:

identifying a data pattern associated with a sub-portion of a dataset;

generating synthetic data based on the data pattern;

anonymizing the sub-portion of the dataset, based on the synthetic data, to generate anonymized data;

transmitting a query to an LLM, wherein the query comprises the anonymized data;

receiving, from the LLM, a response to the query; and deanonymizing the response based on the synthetic data.

2. The method of claim 1, wherein generating the anonymized data comprises modifying at least a part of the sub-portion based on the synthetic data.

3. The method of claim 2, wherein modifying at least the part of the sub-portion comprises replacing the part of the sub-portion with the synthetic data.

4. The method of claim 1, further comprising:

identifying the sub-portion of the dataset by determining that the sub-portion comprises sensitive information.

5. The method of claim 1, wherein the data pattern comprises a data format, or a characteristic, or both, of the sub-portion of the dataset.

6. The method of claim 1, wherein identifying the data pattern comprises determining that the sub-portion is of a predefined alphanumerical format.

7. The method of claim 1, wherein identifying the data pattern comprises receiving the data pattern from a user device.

8. The method of claim 1, wherein generating the synthetic data comprises using an algorithm representing the data pattern.

9. The method of claim 1, wherein deanonymizing the response based on the synthetic data is based on a mapping between the synthetic data and the sub-portion of the dataset.

10. The method of claim 1, comprising:

determining a confidence score for the response;

in response to the confidence score being less than a threshold value, determining a boundary condition; and obtaining an updated response from the LLM for the query using the boundary condition.

11. The method of claim 1, comprising:

receiving an input including the sub-portion of the dataset;

in response to the input being related to the dataset, anonymizing the sub-portion of the dataset in the input based on the synthetic data to generate an additional anonymized data; and transmitting an additional query to the LLM, wherein the additional query comprises the additional anonymized data.

12. The method of claim 11, comprising:

receiving, from the LLM, an additional response to the additional query; and deanonymizing the response based on the synthetic data.

13. A system, comprising:

processing circuitry; and a memory, accessible by the processing circuitry, and storing instructions that, when executed by the processing circuitry, cause the processing circuitry to perform operations comprising:

identifying a data pattern associated with a sub-portion of a dataset;

generating synthetic data based on the data pattern;

anonymizing the sub-portion of the dataset, based on the synthetic data, to generate anonymized data;

transmitting a query to an LLM, wherein the query comprises the anonymized data;

receiving, from the LLM, a response to the query; and deanonymizing the response based on the synthetic data.

14. The system of claim 13, wherein the data pattern comprises a data format, or a characteristic, or both, of the sub-portion of the dataset.

15. The system of claim 13, wherein the synthetic data is generated using an algorithm representing the data pattern.

16. The system of claim 13, wherein the processing circuitry is included in a client instance.

17. A non-transitory, computer readable medium comprising instructions that, when executed by processing circuitry, cause the processing circuitry to perform operations comprising:

identifying a data pattern associated with a sub-portion of a dataset;

generating synthetic data based on the data pattern;

anonymizing the sub-portion of the dataset, based on the synthetic data, to generate anonymized data;

transmitting a query to an LLM, wherein the query comprises the anonymized data;

receiving, from the LLM, a response to the query; and deanonymizing the response based on the synthetic data.

18. The non-transitory, computer readable medium of claim 17, wherein the data pattern comprises a data format, or a characteristic, or both, of the sub-portion of the dataset.

19. The non-transitory, computer readable medium of claim 17, wherein the synthetic data is generated using an algorithm representing the data pattern.

20. The non-transitory, computer readable medium of claim 17, wherein generating the anonymized data comprises modifying at least a part of the sub-portion based on the synthetic data.

* * * * *